(12) United States Patent
Vong et al.

(10) Patent No.: US 9,927,022 B2
(45) Date of Patent: Mar. 27, 2018

(54) VIBRATION ISOLATOR FOR MANUAL TRANSMISSION SHIFTER WITH A SINGLE REACTION ARM

(71) Applicant: FORD GLOBAL TECHNOLOGIES, LLC, Dearborn, MI (US)

(72) Inventors: Chin L. Vong, Livonia, MI (US); Jeffrey M. Albers, Willis, MI (US); Stephen M. Duane, Plymouth, MI (US); Athanasios K. Teknos, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 290 days.

(21) Appl. No.: 14/873,244

(22) Filed: Oct. 2, 2015

(65) Prior Publication Data
US 2017/0097088 A1   Apr. 6, 2017

(51) Int. Cl.
| | |
|---|---|
| *F16H 59/00* | (2006.01) |
| *F16H 59/02* | (2006.01) |
| *F16F 15/08* | (2006.01) |
| *F16F 1/373* | (2006.01) |
| *F16H 59/04* | (2006.01) |

(52) U.S. Cl.
CPC ....... *F16H 59/0208* (2013.01); *F16F 1/3732* (2013.01); *F16F 15/08* (2013.01); *F16H 59/04* (2013.01)

(58) Field of Classification Search
CPC ...... F16H 59/0208; F16H 59/04; F16F 15/08; F16F 1/3732

USPC .................................. 74/470, 473.29, 473.3
See application file for complete search history.

(56) References Cited

U.S. PATENT DOCUMENTS

| | | | | |
|---|---|---|---|---|
| 2,044,392 | A | * 6/1936 | Lord | F16C 11/04 24/33 P |
| 4,086,822 | A | * 5/1978 | Kuroda | F16H 61/26 74/473.29 |
| 4,711,135 | A | 12/1987 | Horiuchi et al. | |
| 5,597,566 | A | * 1/1997 | Huls | F16D 3/28 403/161 |

(Continued)

FOREIGN PATENT DOCUMENTS

| | | |
|---|---|---|
| CN | 202986828 U | 6/2013 |
| GB | 2246989 A | 2/1992 |
| JP | 5863526 A | 4/1983 |

*Primary Examiner* — Victor L MacArthur
(74) *Attorney, Agent, or Firm* — James Dottavio; MacMillan, Sobanski & Todd, LLC

(57) ABSTRACT

A manual transmission shifter includes a reaction arm mounting the shifter to a transmission via a bushing. The bushing includes a resilient member having a tubular section lining a mounting hole in the arm and having a flange extending around the hole. The bushing includes a rigid cup member having an inner sleeve disposed within the tubular section and having a cup rim defining a recess between the inner sleeve and cup rim with a predetermined depth. The flange has a thickness greater than the predetermined depth and is inserted in the recess to create an open gap between the cup rim and the arm. A fastener extends through the inner sleeve to attach the cup member to a transmission bracket. The resilient member attenuates vibrations through the bushing. The arm is provided with a limited range of longitudinal rotation by contact of the arm with the cup rim.

6 Claims, 5 Drawing Sheets

(56) References Cited

U.S. PATENT DOCUMENTS

| | | |
|---|---|---|
| 6,240,803 B1 | 6/2001 | Sjöström et al. |
| 7,464,621 B2 | 12/2008 | Mathis et al. |
| 2006/0096401 A1* | 5/2006 | Mathis .................. F16H 59/042 74/473.1 |
| 2011/0290607 A1 | 12/2011 | Teknos et al. |
| 2013/0145882 A1 | 6/2013 | Hartleip et al. |
| 2017/0097088 A1* | 4/2017 | Vong ................... F16H 59/0208 |
| 2017/0097089 A1* | 4/2017 | Teknos ................ F16H 59/0208 |

* cited by examiner

VIBRATION ISOLATOR FOR MANUAL TRANSMISSION SHIFTER WITH A SINGLE REACTION ARM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to transmission shifters, and, more specifically, to a bushing for mounting a shifter reaction arm to a transmission housing.

Gear selection for manual transmissions is typically implemented using a shift lever mounted to a shifter housing for manipulation by an driver according to a shift pattern. A shift linkage is connected between the shift lever and a transmission selector rod that physically moves the transmission operation from one gear to another. The shifter housing is typically connected to the vehicle body and to the transmission housing. One or more reaction arms typically connects the front of the shifter housing to the transmission housing via a bushing.

In order to ensure smooth gear selection, movement of the shift linkage (e.g., rotation of a selector rod) must be within a predefined angular range. If rod rotation is outside this range, an attempted gear selection can result in grinding or clashing or the wrong gear may be selected. Typically, the accuracy required for positioning the shift linkage necessitates maintaining an orientation of the shift housing which varies by no more than about 1.5° of rotation around its forward axis (i.e., parallel to the shift linkage).

Vibrations from the vehicle powertrain may be coupled into the shifter housing through either the mountings to the body or transmission housing, resulting in undesirable noise and vibration at the shift lever and into the shift knob/handle. The more significant path for noise and vibration propagation is via the front connection of the reaction arm(s) to the transmission case.

Relatively soft, compliant attachments to the shifter housing can reduce noise and vibration but also results in less control over the exact relative positions of the shifter components and transmission. In order to reduce the propensity for rotational movement of the shifter housing, dual reaction arms can be used to connect the shifter housing with the transmission housing. Spaced, parallel arms increase resistance against any rotational torque applied to the shifter housing (e.g., manual forces when shifting the shift lever according to the shift pattern). With dual reaction arms, rotation may be sufficiently reduced to permit the use of relatively soft rubber bushings at the connection points of the reaction arms to the transmission housing. However, dual reaction arms increase the packaging space, weight, and cost for the shifter.

A single reaction arm may be preferred in order to reduce packaging space, weight, and cost. However, a relatively stiffer bushing has been required in order to avoid rotation which can interfere with gear shifting. Consequently, noise and vibration transmitted to the shift lever are increased. It would be desirable to improve isolation of vibrations across a bushing connection while simultaneously limiting rotation of the reaction arm.

SUMMARY OF THE INVENTION

In one aspect of the invention, a manual transmission shifter comprises a shifter housing, a shift lever pivotably connected to the housing, and a shift linkage connected to the lever and adapted to connect to a gear selector of a transmission. A reaction arm extends from the housing to a distal end with has a center bore extending between outer ring surfaces. A bushing is adapted to couple the distal end to a receiving bracket of the transmission. The bushing comprises an inner sleeve having a first hardness and a barrel radially disposed over the inner sleeve and having a second hardness lower than the first hardness to attenuate vibrations. The barrel and inner sleeve are fitted into the center bore. A cup having the first hardness is adapted to be fixed with respect to the bracket. The cup has a cup outer rim extending toward one of the outer ring surfaces defining a recess having a predetermined depth between the cup outer rim and the inner sleeve. A flange with the second hardness is disposed in the recess and bears against the one of the outer ring surfaces. The flange has a thickness greater than the predetermined depth, thereby creating an open gap between the cup outer rim and the one of the outer ring surfaces. Thus, the reaction arm is provided with a limited range of longitudinal rotation by contact of the outer ring surface with the cup outer rim when the flange becomes compressed.

DETAILED DESCRIPTION OF PREFERRED EMBODIMENTS

Figure 1:
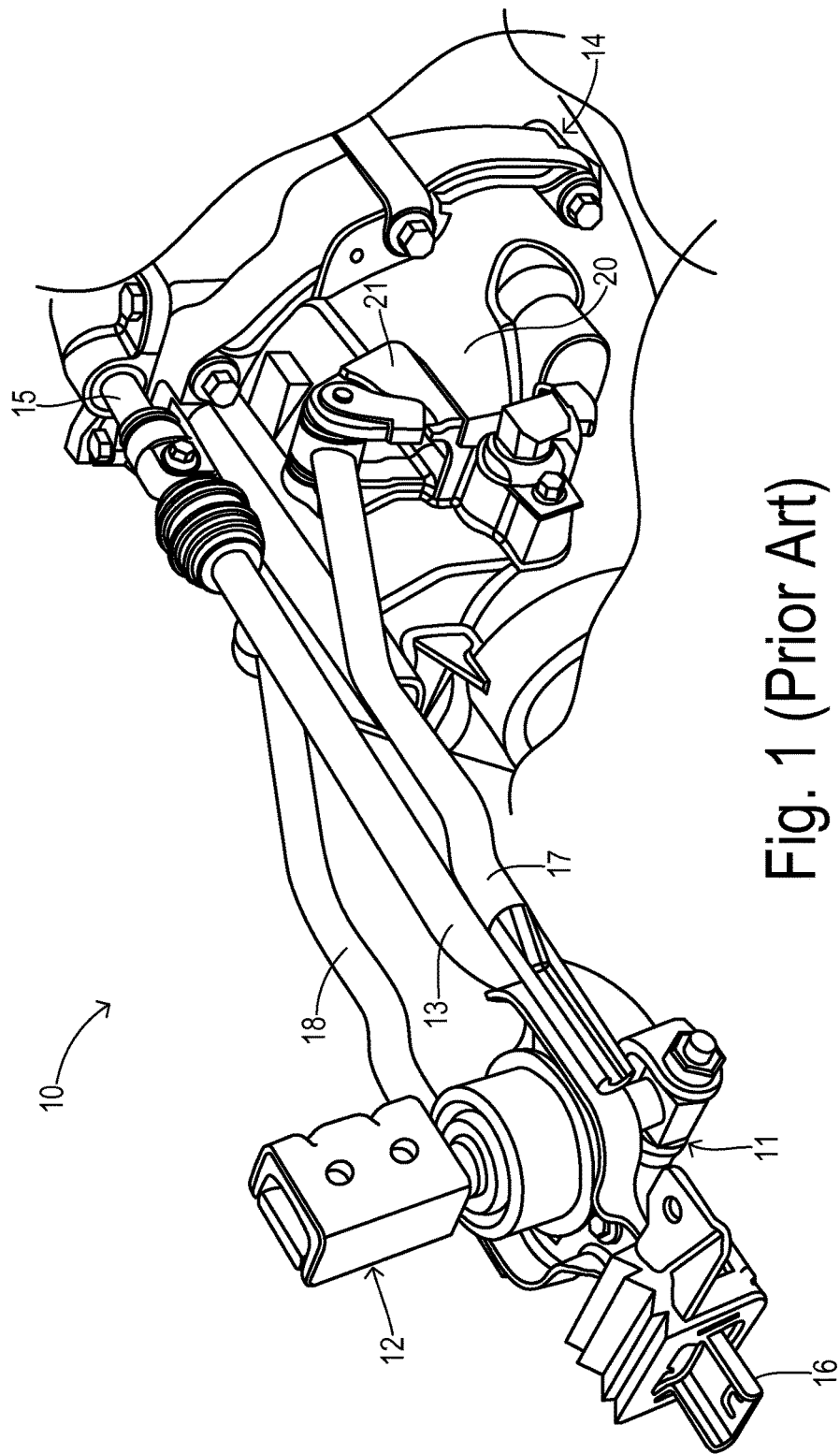
FIG. 1 is a perspective view of a prior art shifter.

Referring now to FIG. 1, a manual transmission shifter system 10 includes a shifter housing 11 supporting a shift lever (shown partially at 12) for moving a shift linkage 13 that is coupled to a transmission selector rod 15 of a manual transmission 14. Housing 11 has a rear body mount 16 and a pair of front reaction arms 17 and 18 for connecting with a transmission case 20. Case 20 carries a brackets (e.g., transmission ears) for attaching reaction arms 17 and 18 via respective bushings. A bracket 21 is seen in FIG. 1 for attaching reaction arm 17. By using reaction arms 17 and 18 on opposite sides of shift housing 11, excessive rocking or rotation of shift housing 11 with respect to the axis of linkage 13 can be avoided even if somewhat compliant bushings are used to attach reaction arms 17 and 18 to transmission case 20. Nevertheless, some amount of undesired rotation may still be present, and a dual reaction arm system of the type shown in FIG. 1 could also achieve improved performance using the bushing of the present invention as described below.

Figure 2:
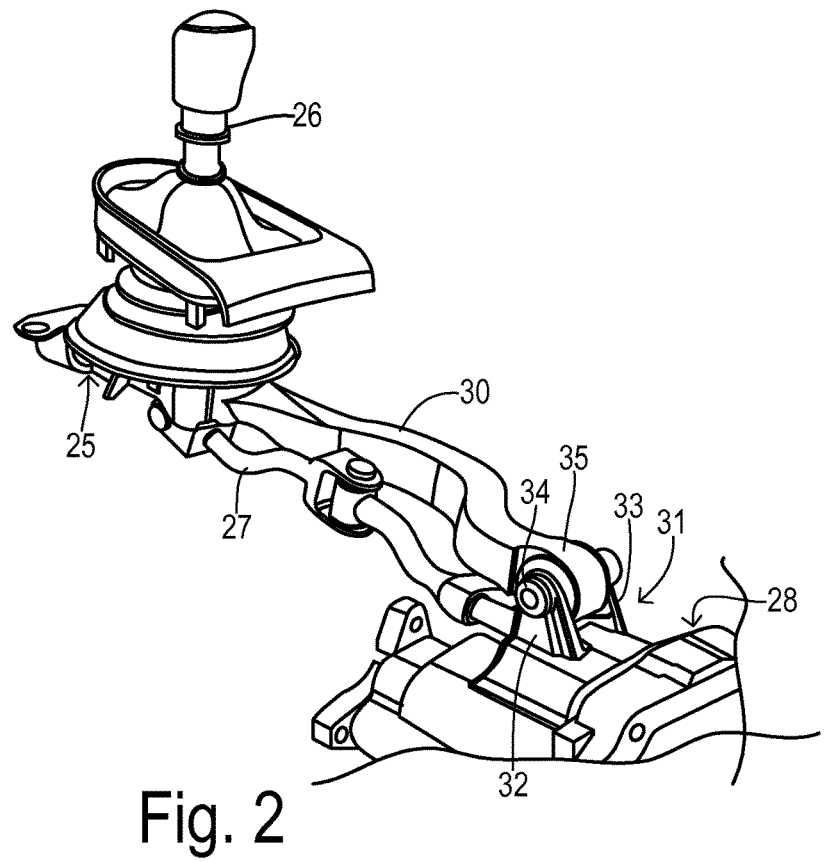
FIG. 2 is a perspective view of shifter of the present invention with a single reaction arm and a vibration-isolating bushing.

FIG. 2 shows a single reaction arm shift system of the present invention. A shift housing 25 supports a shift lever 26 which is movable according to a shift pattern in order to manipulate a shift linkage 27 that connects with a manual transmission 28. A single reaction arm 30 extends from shift housing 25 to connect with transmission 28 at a bracket 31 comprised of transmission housing ears 32 and 33. A bushing 34 connects a distal end 35 of reaction arm 30 to bracket 31.

Figure 3:
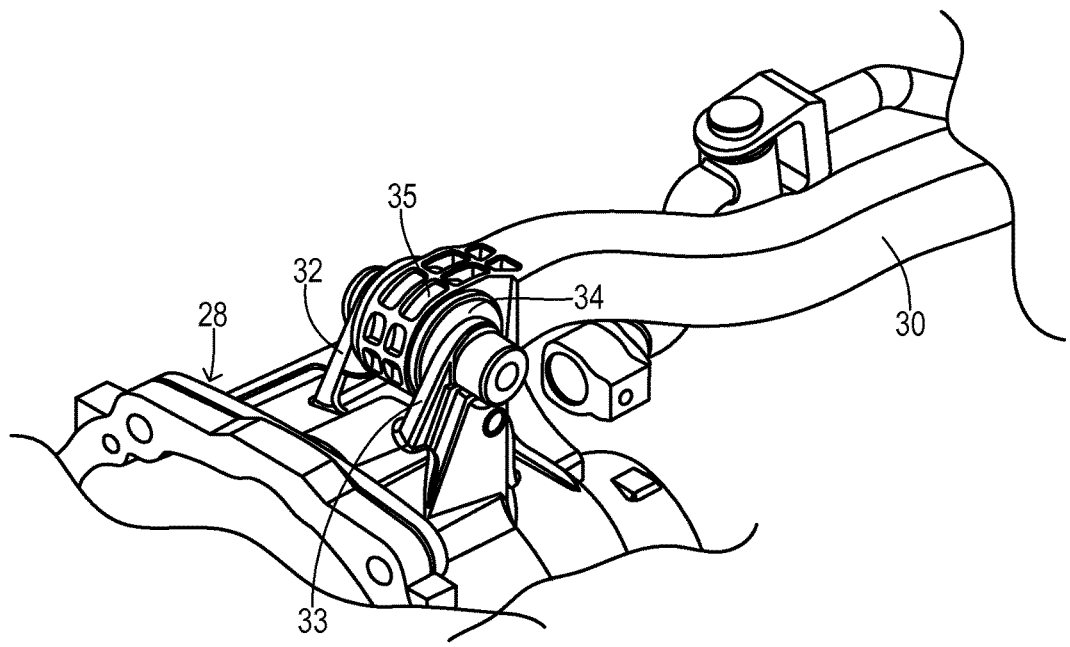
FIG. 3 another perspective view of the shifter of FIG. 2.
Figure 4:
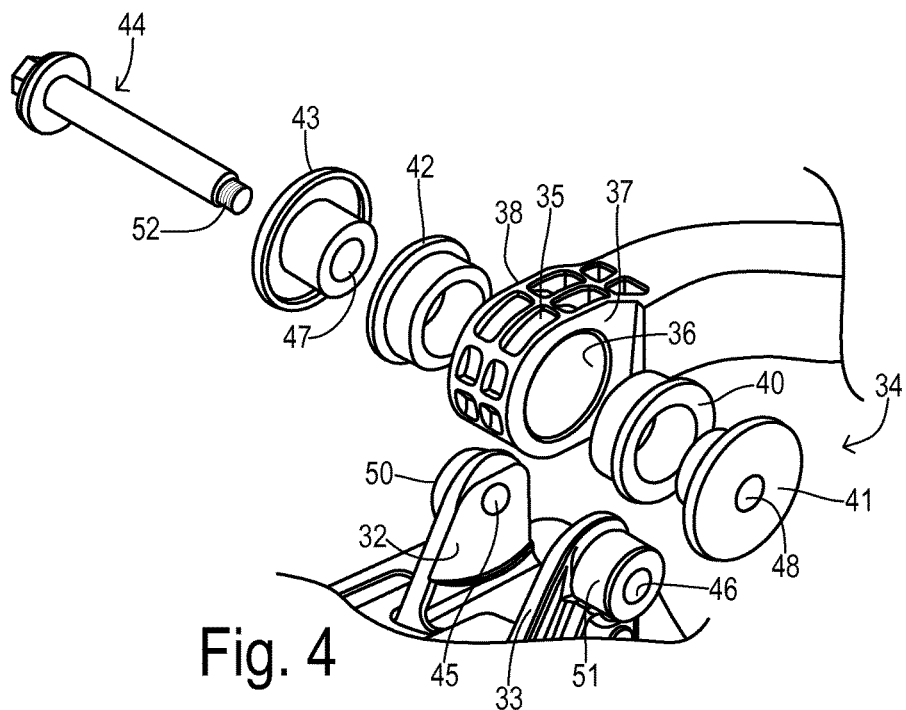
FIG. 4 is an exploded, perspective view showing the bushing in greater detail.

FIG. 3 shows a close-up view of the reaction arm attachment, with FIG. 4 showing an exploded view from the same perspective. Distal end 35 has a center bore 36 extending between outer ring surfaces 37 and 38 on opposite sides of distal end 35 for receiving bushing 34. In the preferred embodiment shown, bushing 34 includes identical axially-adjacent pairs of a resilient member and a rigid cup number. More specifically, the first resilient member 40 and a first cup number 41 are inserted into center bore 36 to bear against outer ring surface 37, and a second resilient member 42 and cup number 43 are inserted into center bore 36 from the other side to bear against outer ring surface 38. The assembled reaction arm and bushing are then inserted between transmission bracket ears 32 and 33 so that a fastening bolt 44 can be inserted through corresponding holes 45 and 46 in ears 32 and 33 and holes 47 and 48 in cup members 43 and 41, respectively. Ears 32 and 33 may include bosses 50 and 51, wherein boss 51 may be threaded in order to receive a threaded portion 52 of fastening bolt 44 in order to secure the reaction arm via the bushing.

Figure 5:
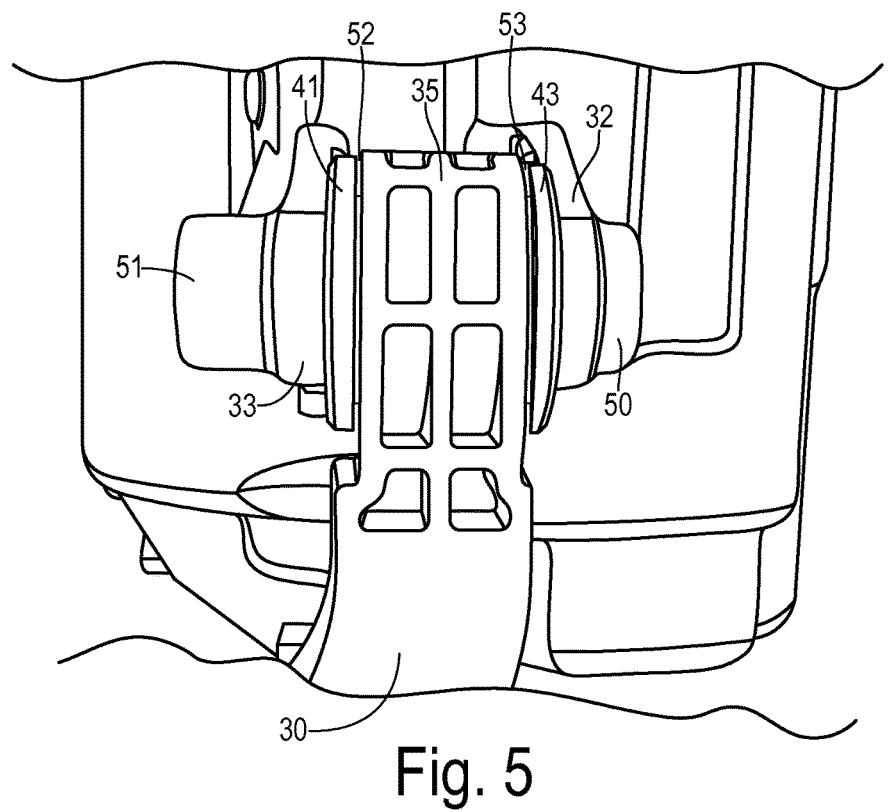
FIG. 5 is a top, close-up view showing the mounting of the reaction arm to the transmission bracket.

As shown in the top view of FIG. 5, certain features on resilient members 40 and 42 and cup members 41 and 43 are configured such that when the several components are installed on reaction arm 30, the outer radial edges of cup members 41 and 43 are spaced from the outer ring surfaces of reaction arm distal end 35 by a respective gap 52 and 53 which operate to impose a limit on a range of arm rotation (i.e., forming a hard stop).

Figure 6:
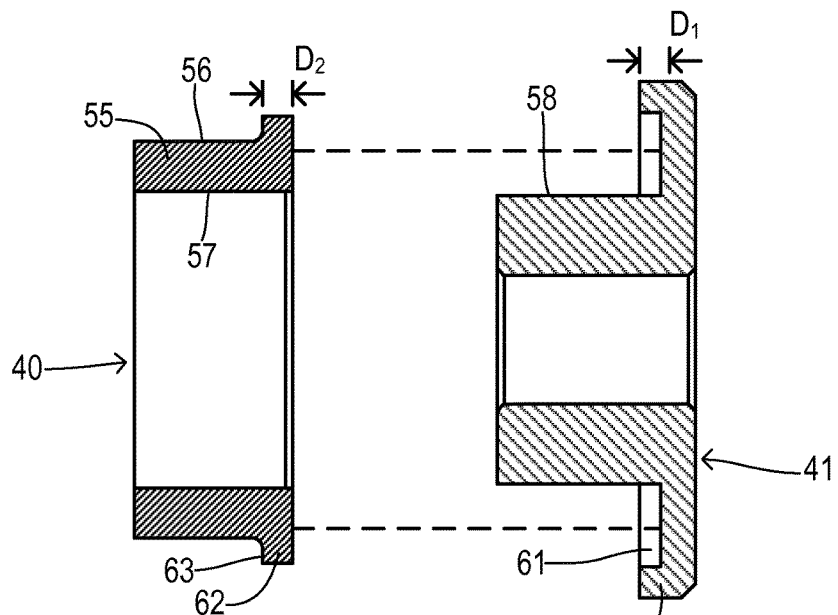
FIG. 6 is an exploded cross section showing a resilient member and a cup member for a bushing of the present invention.

FIG. 6 shows a cross-section of a first axial portion of the bushing comprised of resilient member 40 and rigid cup number 41. Resilient member 40 has a barrel section 55 having an outer cylindrical surface 56 with an outside diameter matching an inside diameter of the center bore of the reaction arm. Barrel section 55 has an inner surface 57 with an inside diameter matching an outside diameter of an inner sleeve portion 58 of cup member 41. Cup member 41 has a cup outer rim 60 which defines a recess 61 between inner sleeve portion 58 and outer rim 60. Recess 61 has a predetermined axial depth $D_1$. Resilient member 40 includes a flange portion 62 having an increased radial diameter beyond barrel section 55 to extend over an outer ring surface of the reaction arm surrounding the center bore. Thus, flange 62 has an inner axial radial face 63 for bearing against an outer ring surface of the reaction arm. Flange 62 has an outside diameter such that flange 62 nests inside recess 61 when barrel section 55 is fitted over inner sleeve 58. However, flange 62 has a thickness $D_2$ which is greater than depth $D_1$. As a result of the greater thickness $D_2$, cup outer rim 60 is normally spaced away from the reaction arm, resulting in the gaps as shown in FIG. 5.

Figure 7:
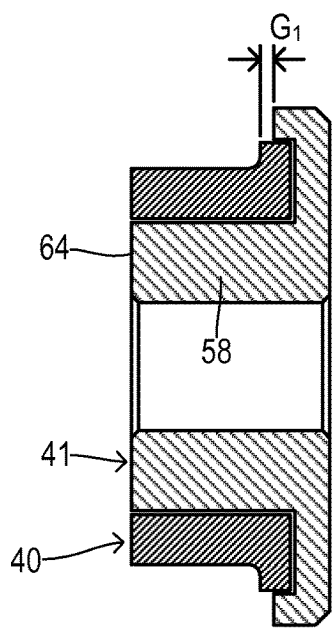
FIG. 7 is a cross section showing the resilient member and cup member of FIG. 6 after assembling them together.

FIG. 7 shows resilient member 40 installed on cup member 41 and the resulting gap $G_1$. Inner sleeve 58 of cup member 41 has an interior radial face 64 which is adapted to abut a similar radial face on a second cup member of a second axial portion of the bushing. Preferably, the second axial portion of the bushing is comprised of an identical pair of a resilient member and a cup member.

The cup members are preferably comprised of a metal such as steel and have a first hardness which is sufficiently rigid to control rotation of the shifter housing. Since the cup members are rigid and they abut by adjoining surfaces, a distance between the two respective cup outer rims is substantially constant once they have been fixed against the bracket on the transmission housing. Preferably, the inner sleeve and cup rim portions of a cup member are integrally formed, e.g., by machining from a metal blank or stock.

The resilient members are preferably comprised of a synthetic rubber such as HNBR or EPDM to provide a second hardness lower than the first hardness, wherein the second hardness is sufficiently low to provide isolation and attenuation of vibrations. The barrel and flange portions are stretchable and compressible so that slight movements of the reaction arm are permitted, at least until the reaction arm contacts a cup rim of one of the cup members as described below. Preferably, the barrel and flange portions are integrally formed, e.g., by injection molding.

Figure 8:
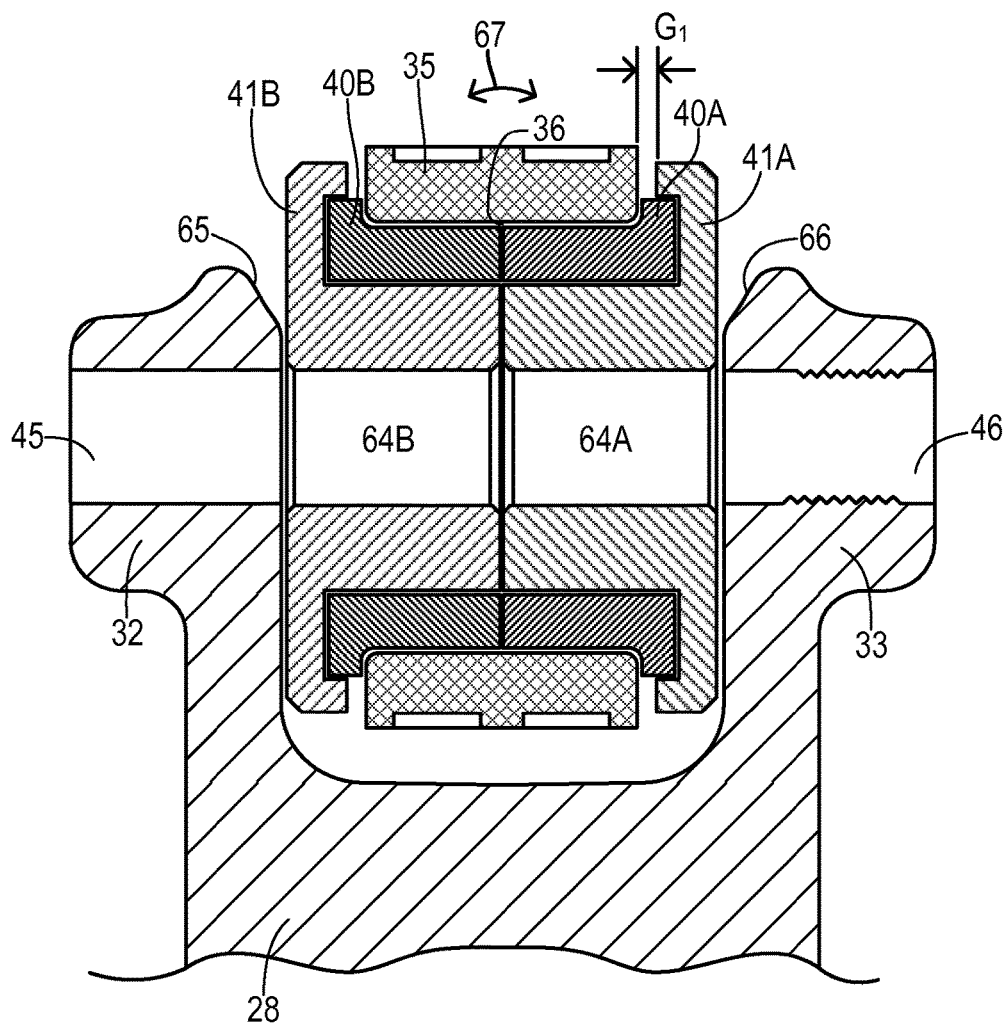
FIG. 8 is an axial cross section of a reaction arm and bushing mounted to a transmission bracket.

FIG. 8 illustrates a cross section of an assembled reaction arm attachment (without the threaded fastening bolt being present). A first axial portion of the bushing has a resilient number 40A and a cup number 41A inserted from one side into central bore 36 of distal end 35 of the reaction arm, and a second axial portion including a resilient member 40B and a cup number 41B inserted from the other side of central bore 36. The reaction arm and bushing are inserted between transmission bracket ears 32 and 33 so that central passages 64A and 64B in the inner sleeves align with holes 45 and 46 in ears 32 and 33. Ears 32 and 33 may include slanted sections 65 and 66 to facilitate insertion of the bushing. Thus, ears 32 and 33 will always squeeze cup members 41A and 41B together until they touch in the middle. Moreover, resilient members 40A and 40B will also be compressed between cup members 41A and 41B so that distal end 35 of the reaction arm is snugly held in place by resilient members 40A and 40B. When no disturbing forces are present, a centered position of distal end 35 maintains gap widths $G_1$ for isolation purposes. Each gap $G_1$ may be about 0.5 mm (+/− about 0.1 mm). During operation of the manual shifter, rotational forces may be applied to the shifter housing which tend to cause rotation of the reaction arm as indicated at 67. The compliance of resilient members 40A and 40B permit such rotation, but the rotation Is limited by contact of distal end 35 with the rims of cup members 41A and 41B. The limited range of longitudinal rotation enables desirable vibration isolation under most conditions. During shifting, the cup members limit a range of arm rotation by contacting the arms after compression of the end flanges of the resilient members.

What is claimed is:

1. A manual transmission shifter comprising:
 a shifter housing;
 a shift lever pivotably connected to the housing;
 a shift linkage connected to the lever and adapted to connect to a gear selector of a transmission;
 a reaction arm extending from the housing to a distal end, wherein the distal end has a center bore extending between outer ring surfaces; and
 a bushing adapted to couple the distal end to a receiving bracket of the transmission, wherein the bushing comprises:

an inner sleeve having a first hardness;
a barrel radially disposed over the inner sleeve and having a second hardness lower than the first hardness to attenuate vibrations, wherein the barrel and inner sleeve are fitted into the center bore;
a cup adapted to be fixed with respect to the bracket and having the first hardness, the cup having a cup outer rim extending toward one of the outer ring surfaces defining a recess having a predetermined depth between the cup outer rim and the inner sleeve; and
a flange having the second hardness disposed in the recess and bearing against the one of the outer ring surfaces, wherein the flange has a thickness greater than the predetermined depth, thereby creating an open gap between the cup outer rim and the one of the outer ring surfaces.

2. The shifter of claim 1 wherein the barrel and flange are integrally formed.

3. The shifter of claim 2 wherein the barrel and flange are integrally molded and comprised of synthetic rubber.

4. The shifter of claim 1 wherein the inner sleeve and cup are integrally formed.

5. The shifter of claim 4 wherein the inner sleeve and cup are comprised of steel.

6. The shifter of claim 1 wherein the inner sleeve, cup, barrel, and flange form a first axial portion of the bushing, and wherein the shifter further comprises:

a second axial portion of the bushing abutting the first axial portion within the bore, wherein the second axial portion comprises:
 a second inner sleeve having the first hardness;
 a second barrel radially disposed over the second inner sleeve and having the second hardness lower than the first hardness to attenuate vibrations, wherein the second barrel and second inner sleeve are fitted into the center bore;
 a second cup adapted to be fixed with respect to the bracket and having the first hardness, the second cup having a second cup outer rim extending toward the other of the outer ring surfaces defining a second recess having the predetermined depth between the second cup outer rim and the second inner sleeve; and
 a second flange having the second hardness disposed in the second recess and bearing against the other of the outer ring surfaces, wherein the second flange has a thickness greater than the predetermined depth, thereby creating a second open gap between the second cup outer rim and the other of the outer ring surfaces; and
a fastening bolt extending through the inner sleeves to fasten the bushing to the bracket.

* * * * *